June 16, 1925.
J. T. WILSON
THEFT SIGNAL
Filed Dec. 15, 1923
1,542,201
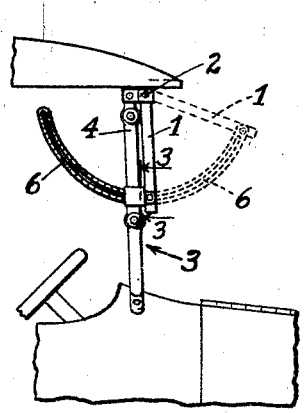
Fig. 1.
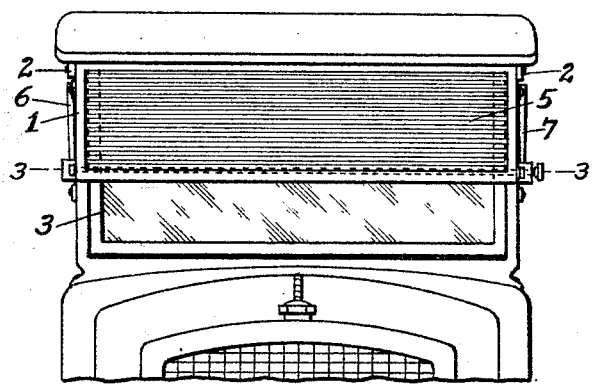
Fig. 2.
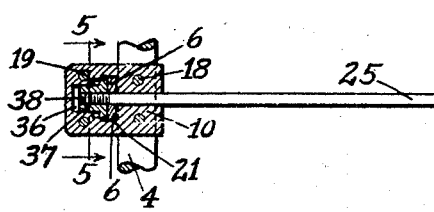
Fig. 3.
Fig. 4.
Fig. 5.
Fig. 6.
Fig. 7.
Fig. 8.
INVENTOR
John T. Wilson
BY
ATTORNEY.

Patented June 16, 1925.

1,542,201

UNITED STATES PATENT OFFICE.

JOHN T. WILSON, OF LOS ANGELES, CALIFORNIA.

THEFT SIGNAL.

Application filed December 15, 1923. Serial No. 680,877.

*To all whom it may concern:*

Be it known that I, JOHN T. WILSON, a citizen of the United States, residing at Los Angeles, in the county of Los Angeles and State of California, have invented new and useful Improvements in Theft Signals, of which the following is a specification.

My invention is a convertible sun shield and theft signal for automobiles and the general object thereof is to provide a sun shield and theft signal of this kind comprising an opaque visor which may be let down in front of an automobile windshield and locked in such position so as to prevent a thief from seeing through the shield to run the automobile and to indicate by such position that the automobile if driven, is being stolen.

Other objects and advantages will appear hereinafter and while I show herewith and will describe a preferred form of construction, I desire to be understood that I do not limit my invention to such preferred form but that various changes and adaptations may be made therein without departing from the spirit of my invention as hereinafter claimed.

Referring to the drawing:

Fig. 1 is a side elevation of my invention applied to the windshield frame of an automobile.

Fig. 2 is a front elevation of my invention as shown in Fig. 1.

Fig. 3 is an enlarged fragmentary vertical section of my invention taken on line 3—3 of Fig. 1.

Fig. 4 is a fragmentary plan view of one of the clamp brackets.

Fig. 5 is a vertical section of said clamp bracket taken on line 5—5 of Fig. 3.

Fig. 6 is a vertical section through the other clamp bracket and the lock taken on line 6—6 of Fig. 3.

Fig. 7 is a detached side view of the visor and bracket, the visor being partly in section.

Fig. 8 is a fragmentary front view of the parts shown in Fig. 7.

In the drawing 1 indicates a visor which is pivotally mounted at its upper edge at 2 in front of an automobile windshield 3 to the upper part of the windshield frame 4. Said visor has an opaque panel 5. Arcuate braces 6 and 7 are pivotally connected at their lower ends by pivots 8 to the side edges, respectively, of the visor 1 near the lower edge of the visor, which braces extend rearwardly through clamp brackets 9 and 10, respectively, secured to the side frame members of the windshield 3.

Each of the braces 6 and 7 increases in thickness from its lower pivoted end to its upper rear end and is formed with corrugations 11 and 12 on its sides respectively. Said members are provided with slots 13.

Each of the clamp brackets 9 and 10 comprises two clamp members 14 and 15 provided respectively with sockets 16 and 17 to receive a side vertical member of the windshield frame 4, the member 14 fitting in front and the member 15 fitting on the rear of said frame member.

Said clamp members are secured together on the frame members by pins 18 and 19, the pins 18 extending through said members. The brackets 9 and 10 are provided with slots 20 and 21 respectively through which extend the braces 6 and 7 respectively.

A clamp shaft 25 extends across the front of the windshield and is journaled in the front bracket members 14 of the brackets 9 and 10, said shaft extending also through the slots 13 in the braces 6 and 7 and through the outside of the member 14 of bracket 9. A thum wheel 26 is secured on the outer end of the shaft 25 outside said bracket 9, turning the shaft. A lock 27 is mounted in the member 14 of bracket 9, which lock comprises a tumbler 28 provided with a notch 29 in its periphery, and a bolt 30 formed with a tongue 31 on one end for engaging said notch. Said tumbler is secured on the shaft 25 within a bore 32 in the member 14 of bracket 9, adjacent the outer side of the brace 6. The bolt 30 is slidably mounted in a slot 33 in the upper part of member 14 of bracket 9 and a pin 34 projects from said bolt into a key hole 35 in the outer side of said member, which pin may be engaged by a key inserted into said key hole so that the key may be operated to withdraw the bolt tongue 31 from the notch 29 to unlock the lock. The member 14 of bracket 10 is provided with a square recess 36 in which fits a nut 37 seated on a thread 38 on the left end of the shaft 25.

By turning the shaft 25 by thum wheel 26 in one direction the shaft and tumbler 28 move to the right, while the nut 37 may move toward the left to allow the thickened rear portion of the braces 6 and 7 to be drawn through the brackets 9 and 10 to lift the visor 1 into its normal upper position as shown in dotted lines in Fig. 1.

Upon reversing said shaft the nut 37 is drawn against the brace 7 and the tumbler 28 is drawn against the brace 6 whereby the visor is secured in its normal uppermost position in which it serves as a sun shield.

When the automobile is parked, the shaft 25 is turned to release the tumbler 28 and nut 37 from the braces 6 and 7 and the visor is let down against the windshield. The shaft is then reversed until the tumbler and nut are drawn tightly against the thin ends of the braces 6 and 7 in which position the notch 29 registers with the tongue 31, whereupon the bolt 30 drops and said tongue engages said notch and locks the visor in its lowered position, in which position the opaque panel 5 will prevent a thief from seeing through the windshields to run the automobile but if the thief should manage to run the automobile in some way, the lowered position of the visor will indicate that the automobile is being stolen and will thus serve as a theft-signal.

The visor may be unlocked by inserting a key into keyhole 35 and lifting the bolt 30 so that the tongue 31 disengages the notch 29. The visor is not locked in its upper position because the tumbler 28 is moved to the right with its notch 29 out of alignment with the bolt 30 to accommodate the thickened end of the brace 7.

I claim as my invention:

1. A convertible sun shield and theft signal for automobiles comprising an opaque visor pivoted at its upper edge to the upper part of the windshield frame, brackets secured on the side members of the windshield frame, slotted arcuate braces connected at one end to the visor and extending through said brackets, a clamp shaft extending through the slots in said braces and journaled in said brackets, a nut screw seated on one end of said shaft for engaging one of said braces, a tumbler on said shaft near its other end for engaging said other brace said nut and said tumbler cooperating to hold said visor in its upper position when used as a sun shield and to lock said visor in a vertical position in front of the windshield when used as a theft signal.

2. A convertible sun shield and theft signal for automobiles comprising an opaque visor pivoted at its upper edge to the upper part of the windshield frame, brackets secured on the side members of the windshield frame, slotted arcuate braces connected at one end to the visor and extending through said brackets, a clamp shaft extending through the slots in said braces and journaled in said brackets, a nut screw seated on one end of said shaft for engaging one of said braces, a tumbler on said shaft near its other end for engaging said other brace for securing said visor in its upper or lower position, said tumblers having a notch therein, and a bolt releasable by a key for engaging said notch to lock the visor in its lowered position.

3. A convertible sun shield and theft signal for automobiles comprising an opaque visor pivoted at its upper edge to the upper part of the windshield frame, brackets secured on the side members of the windshield frame, slotted arcuate braces with corrugated sides connected at one end to the visor and extending through said brackets, a clamp shaft extending through the slots in said braces and journaled in said brackets, a nut screw seated on one end of said shaft for engaging one of said braces, a tumbler on said shaft near its other end for engaging said other brace said nut and said tumbler cooperating to hold said visor in its upper position when it is used as a sun shield and to lock said visor in its lower position when used as a theft signal, and tion, said braces being corrugated on their sides.

4. A convertible sun shield and theft signal for automobiles comprising an opaque visor pivoted at its upper edge to the upper part of the windshield frame, brackets secured on the side members of the windshield frame, slotted arcuate braces connected at one end to the visor and extending through said brackets, a clamp shaft extending through the slots in said braces and journaled in said brackets, a nut screw seated on one end of said shaft for engaging one of said braces, a tumbler on said shaft near its other end for engaging said other brace for securing said visor in its upper or lower position, said tumblers having a notch therein, and a bolt releasable by a key for engaging said notch to lock the visor in its lowered position, said braces being increased in thickness to their rear ends so that when the visor is raised said tumbler will be moved out with its notch out of alignment with said bolt.

JOHN T. WILSON.